(12) United States Patent
Lee et al.

(10) Patent No.: US 11,678,738 B2
(45) Date of Patent: Jun. 20, 2023

(54) VIBRATING TOOTHBRUSH AND ECCENTRIC SHAFT

(71) Applicant: LG HOUSEHOLD & HEALTH CARE LTD., Seoul (KR)

(72) Inventors: Jung Yong Lee, Daejeon (KR); Jong Hoon Lee, Daejeon (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 506 days.

(21) Appl. No.: 16/967,353

(22) PCT Filed: Apr. 25, 2018

(86) PCT No.: PCT/KR2018/004805
§ 371 (c)(1),
(2) Date: Aug. 4, 2020

(87) PCT Pub. No.: WO2019/208846
PCT Pub. Date: Oct. 31, 2019

(65) Prior Publication Data
US 2021/0030145 A1    Feb. 4, 2021

(51) Int. Cl.
*A46B 13/02*    (2006.01)
*A46B 9/04*    (2006.01)
*A46B 15/00*    (2006.01)
*A61C 17/34*    (2006.01)
*H02K 7/06*    (2006.01)

(52) U.S. Cl.
CPC .............. *A46B 13/023* (2013.01); *A46B 9/04* (2013.01); *A46B 15/0016* (2013.01); *A61C 17/3481* (2013.01); *H02K 7/063* (2013.01)

(58) Field of Classification Search
CPC .............. A46B 13/023; A46B 15/0016; A61C 17/3481
See application file for complete search history.

(56) References Cited

U.S. PATENT DOCUMENTS

| | | |
|---|---|---|
| 2010/0269275 A1 | 10/2010 | Shimoyama et al. |
| 2012/0279739 A1 | 11/2012 | Hata |
| 2013/0198980 A1 | 8/2013 | Iwahori et al. |

FOREIGN PATENT DOCUMENTS

| | | |
|---|---|---|
| CN | 201052193 Y | 4/2008 |
| CN | 201524150 U | 7/2010 |
| CN | 102198020 A | 9/2011 |
| CN | 203234859 U | 10/2013 |
| JP | 7-24127 U | 5/1995 |

(Continued)

*Primary Examiner* — Shay Karls
(74) *Attorney, Agent, or Firm* — Birch, Stewart, Kolasch & Birch, LLP

(57) ABSTRACT

A vibrating toothbrush and an eccentric shaft are proposed. The vibrating toothbrush includes a head in which bristles are planted, and a handle from which a head coupler protrudes, the head being detachably coupled to the head coupler. The toothbrush includes an electric motor accommodated in the handle to generate rotating force; and an eccentric shaft rotatably connected to the electric motor, at least a portion thereof being eccentric to generate vibration and thereby transmit vibration to the head coupler. The eccentric shaft includes a motor fixing part connected to the electric motor; an eccentric weight configured to be offset from a rotation center of the electric motor; and a rotating shaft formed of a metal material, and connecting the motor fixing part and the eccentric weight.

18 Claims, 3 Drawing Sheets

(56) References Cited

FOREIGN PATENT DOCUMENTS

| | | | |
|---|---|---|---|
| JP | 2008-80099 | A | 4/2008 |
| JP | 5477050 | B2 | 4/2014 |
| KR | 10-2006-0003497 | A | 1/2006 |
| KR | 10-0591396 | B1 | 6/2006 |
| KR | 10-0886164 | B1 | 2/2009 |
| KR | 10-2012-0057620 | A | 6/2012 |

VIBRATING TOOTHBRUSH AND ECCENTRIC SHAFT

CROSS REFERENCE TO RELATED APPLICATIONS

This application is the National Phase of PCT International Application No. PCT/KR2018/004805, filed on Apr. 25, 2018, which is hereby expressly incorporated by reference into the present application.

TECHNICAL FIELD

The present disclosure relates to a vibrating toothbrush and an eccentric shaft. More particularly, the present disclosure relates to a vibrating toothbrush capable of firmly manufacturing an eccentric shaft that generates vibration, and an eccentric shaft.

BACKGROUND ART

Generally, a toothbrush includes a head which is formed of a plastic material and in which bristles are planted, and a handle which extends from the head to allow a user to grip it. Here, a user holds the handle with his or her hand, and then stimulates a tooth surface, an interdental space, a gum and the like using the bristles planted in the head, thus removing foreign substances or scale.

In order to maximize tooth brushing effect, brushing for 2 to 3 minutes is recommended. The brushing of the recommended time may damage a person's wrist, give fatigue to the arm, and make the control of power for moving the head unstable, thus hurting gums or an oral cavity.

In order to solve the problems and increase a user's convenience, there has been developed a toothbrush product configured such that power of a dry cell or a storage battery is applied to an electric motor and thus the electric motor is rotated to rotate bristles, or a rotating force generated by the electric motor is converted into vibration or generates ultrasonic vibration. Such a product is effectively used to remove foreign substances from the teeth or oral cavity through the rotation of the bristles or the vibration of the bristles.

Among conventional products, a product that generates vibration using an electric motor transmits vibration generated during the rotation of an eccentric shaft to a head, using the eccentric shaft connected to the electric motor.

However, the conventional eccentric shaft is problematic in that it is made of synthetic resin such as plastic, so that the eccentric shaft may be broken during strong rotation. Alternatively, if the eccentric shaft is made thick so as to prevent the eccentric shaft from being broken, elasticity is not secured, and consequently vibration is not transmitted properly and noise is increased. If elastic force is insufficient, the rotation of the eccentric shaft may be forcibly stopped by external shock.

Such a conventional vibrating toothbrush is problematic in that both durability and elasticity are not secured in terms of material or shape. As consumer demand for vibrating toothbrushes is gradually increasing, the necessity of developing technology for solving the above-mentioned problems is increasing.

DOCUMENTS OF RELATED ART (Patent Document 1) KR 10-0886164 (Feb. 23, 2009)

DISCLOSURE

Technical Problem

The present disclosure has been made to solve the above-mentioned problems and difficulties and relates to a vibrating toothbrush that uses an eccentric shaft formed of metal at least partially, thus securing durability and simultaneously guaranteeing elastic force and restoring force, and an eccentric shaft.

Technical Solution

A vibrating toothbrush according to an embodiment of the present disclosure includes a vibrating toothbrush having a head in which bristles are planted, and a handle from which a head coupler protrudes, the head being detachably coupled to the head coupler, the toothbrush including an electric motor accommodated in the handle to generate rotating force; and an eccentric shaft rotatably connected to the electric motor, at least a portion thereof being eccentric to generate vibration and thereby transmit vibration to the head coupler, wherein the eccentric shaft may include a motor fixing part connected to the electric motor; an eccentric weight configured to be offset from a rotation center of the electric motor; and a rotating shaft formed of a metal material, and connecting the motor fixing part and the eccentric weight.

The rotating shaft may have a diameter of 0.4 to 1.0 mm.

A central line of the eccentric weight may be offset from the rotation center of the electric motor by a distance within 2 mm.

The eccentric shaft may further include a weight fixing part connecting the eccentric weight and the rotating shaft, and each of the motor fixing part and the weight fixing part may have a section that is relatively larger than that of the rotating shaft.

The eccentric shaft may further include a shock absorber provided between the motor fixing part and the rotating shaft or between the weight fixing part and the rotating shaft.

The shock absorber may have a section that is enlarged from the rotating shaft to the motor fixing part or the weight fixing part.

The shock absorber may include on a surface thereof at least one or more grooves.

The grooves may be configured such that their sizes are relatively increased from the rotating shaft to the motor fixing part or the weight fixing part.

The shock absorber may have a height that is within 35% of a length between the motor fixing part and the weight fixing part.

The shock absorber provided between the motor fixing part and the rotating shaft may have a height that is relatively smaller than the shock absorber provided between the rotating shaft and the weight fixing part.

The rotating shaft may be indirectly connected to the motor fixing part or the weight fixing part by the shock absorber.

The shock absorber may be provided to surround a first end or a second end of the rotating shaft that is directly connected to the weight fixing part or the motor fixing part.

The eccentric shaft may be made of a synthetic resin material, except for the rotating shaft, the weight fixing part and the eccentric weight may be integrally provided, and the first end of the rotating shaft may be coupled to the weight fixing part, and the second end thereof may be coupled to the motor fixing part, thus connecting the motor fixing part and the eccentric weight.

The eccentric weight may be provided adjacent to the head coupler or provided in the head coupler.

The eccentric shaft may further include a bearing fixing part protruding from the eccentric weight and rotatably coupled to a bearing that is provided in the head coupler.

The bearing fixing part may have a section that is relatively larger than that of the rotating shaft but is relatively smaller than that of the motor fixing part or the weight fixing part.

An eccentric shaft used in a vibrating toothbrush that is configured to accommodate an electric motor therein and impart vibration to bristles according to an embodiment of the present disclosure includes a motor fixing part connected to the electric motor; an eccentric weight configured to be offset from a rotation center of the electric motor; and a rotating shaft formed of a metal material and connecting the motor fixing part and the eccentric weight.

The eccentric shaft may further include a weight fixing part connecting the eccentric weight and the rotating shaft; and a shock absorber provided between the motor fixing part and the rotating shaft or between the weight fixing part and the rotating shaft, with at least one groove being formed in a surface of the shock absorber.

Advantageous Effects

In a vibrating toothbrush and an eccentric shaft according to the present disclosure, a portion of the eccentric shaft is formed of a metal material such as nickel titanium, thus securing elastic force and tensile force, and optimizing the thickness of the portion of the eccentric shaft that is formed of metal, and a distance between a central line of an eccentric weight and a rotation center of the eccentric shaft is limited, thus effectively suppressing noise from being generated.

BEST MODE

Figure 1:
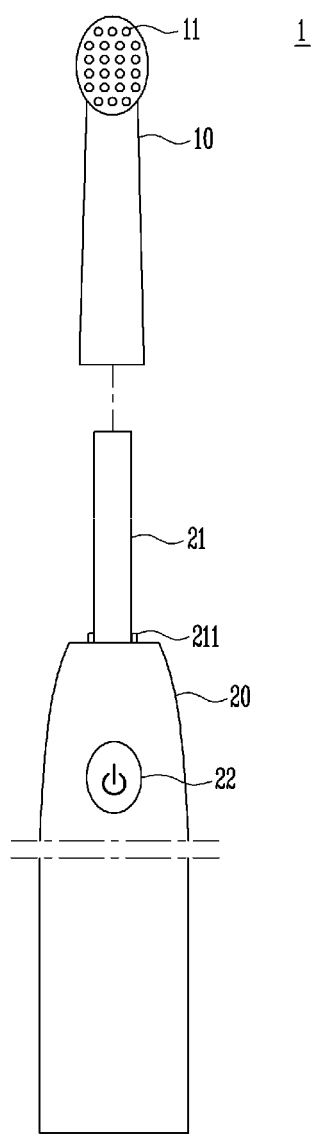
FIG. 1 is an exploded view illustrating a vibrating toothbrush in accordance with an embodiment of the present disclosure.

The above and other objects, features, and other advantages of the present disclosure will be more clearly understood from the following detailed description when taken in conjunction with the accompanying drawings. In the present specification, it should be noted that the same reference numerals are used to denote the same components throughout different drawings. In the following description, the detailed description of known functions and configurations that may unnecessarily obscure the subject matter of the present disclosure will be omitted.

Hereinafter, a preferred embodiment of the present disclosure will be described in detail with reference to the accompanying drawings.

For reference, hereinafter, one end may be a direction in which a head is provided with respect to the vibration toothbrush, and the other end may be a direction in which a cover is provided. However, the present disclosure is not limited thereto.

Figure 2:
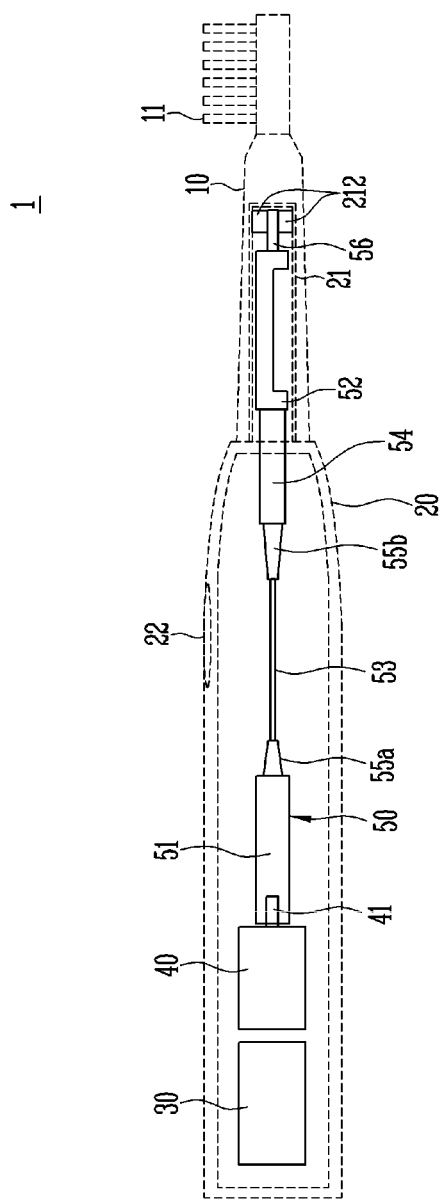
FIG. 2 is a sectional view illustrating the vibrating toothbrush in accordance with the embodiment of the present disclosure.
Figure 3:
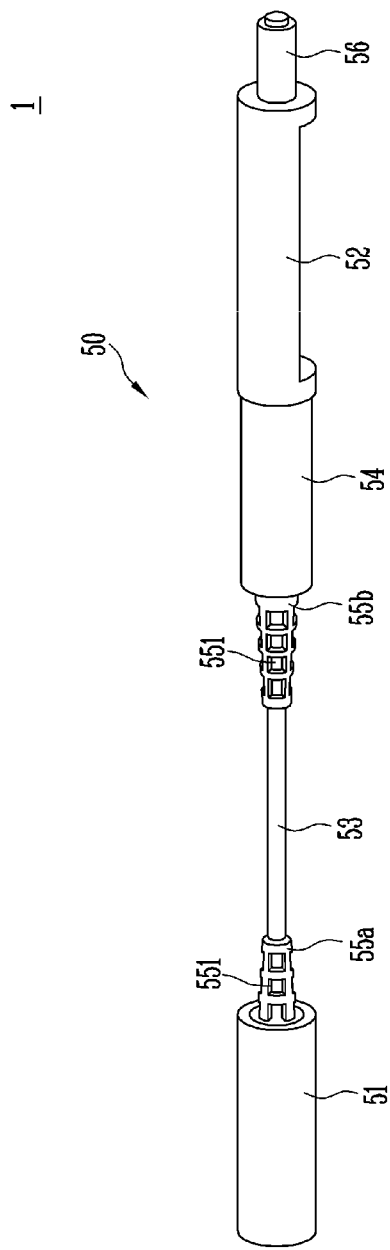
FIG. 3 is a perspective view illustrating an eccentric shaft of the vibrating toothbrush in accordance with the embodiment of the present disclosure.

FIG. 1 is an exploded view illustrating a vibrating toothbrush in accordance with an embodiment of the present disclosure, FIG. 2 is a sectional view illustrating the vibrating toothbrush in accordance with the embodiment of the present disclosure, and FIG. 3 is a perspective view illustrating an eccentric shaft of the vibrating toothbrush in accordance with the embodiment of the present disclosure.

Referring to FIGS. 1 to 3, the vibrating toothbrush 1 in accordance with the embodiment of the present disclosure includes a head 10, a handle 20, a power supply 30, an electric motor 40, and an eccentric shaft 50.

The head 10 includes bristles 11 planted therein. The head 10 is fitted over a head coupler 21 of the handle 20 that will be described later, so that vibration transmitted from the head coupler 21 may be transmitted through the bristles 11 to teeth.

Although the bristles 11 may be provided on a surface of the head 10, the bristles may also be provided on an opposite surface as well as the surface. In other words, a position where the bristles 11 are provided is not limited to a specific position. Furthermore, when a plurality of planting holes (unlabelled) is formed on a surface of the head 10, a plurality of bristles 11 may be fixedly provided in each of the planting holes. Alternatively, one bristle made of synthetic resin may be fixedly inserted into one planting hole.

Furthermore, the arrangement of the bristles 11 on a surface of the head 10 is not particularly limited. That is, the number or size of the bristles 11 arranged horizontally and vertically may be variously determined. Likewise, the size of a surface on the head 10 in which the bristles 11 are planted is not limited.

Vibration generated by the rotation of the eccentric shaft 50 that will be described later may be transmitted to the bristles 11 of the head 10. Therefore, a user may brush teeth while rubbing the teeth or interdental spaces with the bristles 11 of the head 10 with the user holding the handle 20. In this case, the head 10 allows foreign substances to be more easily removed from teeth or interdental spaces by vibration, as compared with a conventional toothbrush having no vibration, thus increasing brushing efficiency.

The head 10 may have a hole (unlabelled) so that the head coupler 21 is inserted therein. A user may fit the head 10 over the head coupler 21 to connect the head 10 to the handle 20.

When the bristles 11 planted in the head 10 are worn, a user may separate the head 10 from the head coupler 21 and then connect a new head 10 thereto. In addition, different heads 10 having bristles 11 of different arrangements may be alternately fitted over the head coupler 21 to be used.

The head coupler 21 to which the head 10 is detachably coupled protrudes from the handle 20. The head coupler 21 may protrude in a rod shape from an end of the handle 20. A user connects the head 10 to the head coupler 21, thus transmitting vibration generated from the handle 20 to the bristles 11.

One end of the head coupler 21 may be a free end that is used to couple the head 10 thereto. Furthermore, in order to prevent vibration from returning to a portion of the handle 20 held by a user when vibration generated in the handle 20 is transmitted through the head coupler 21 to the head 10, a vibration damping member (not shown) may be provided on the other end of the head coupler.

In other words, the vibration damping member surrounds a root end of the head coupler 21, thus preventing vibration from returning to the portion of the handle 20 held by a user or minimizing the return of the vibration, even if the head coupler 21 is vibrated.

Although the vibration damping member may be an elastic member such as a spring, the vibration damping member may use a member, such as rubber, having a sealing function so as to prevent water or the like from permeating into the handle 20 through the root end of the head coupler 21.

A protrusion 211 may be provided on the head coupler 21. The head coupler 21 may be provided in the rod shape, and the hole having a shape corresponding to that of the head coupler 21 may be provided in the head 10, so that the head coupler 21 may be fitted into the head 10. In this case, the protrusion 211 may be provided to limit the coupling direction of the head 10.

Of course, unless the section of the head coupler 21 is circular, a direction in which the head 10 is coupled to the head coupler 21 may be limited even if there is no protrusion 211. In this case, the protrusion 211 may be omitted.

The power supply 30, the electric motor 40, and the eccentric shaft 50 may be provided in the handle 20. Here, at least a portion of the eccentric shaft 50 may be located in the head coupler 21. Particularly, an eccentric weight 52 included in the eccentric shaft 50 may be provided in the head coupler 21. Thus, if vibration is generated by the eccentric weight 52, the vibration may be effectively transmitted through the head coupler 21 to the head 10.

Here, a bearing 212 may be provided in one end of the head coupler 21. The bearing 212 may be configured to rotatably support one end of the eccentric shaft 50, thus allowing the eccentric shaft 50 provided in the head coupler 21 to be stably rotated. A bearing fixing part 56 of the eccentric shaft 50 that will be describe later may be coupled to the bearing 212.

A cover (unlabelled) may be provided on the other end that is opposite to one end of the handle 20 on which the head coupler 21 is provided. The cover may be configured to open or close the interior of the handle 20, and may allow the power supply 30 accommodated in the handle 20 to be replaced with another one.

Furthermore, the cover may be configured to supply power to the power supply 30. For example, the cover may be configured to receive power from an external device and then transmit the power to the power supply 30. Here, the structure of the cover need not be metal, and may have a contactless charging structure that is widely used.

A switch 22 is provided on the handle 20. The switch 22 is configured to control the on/off of vibration, and may be coupled to the electric motor 40. If a user presses the switch 22 while holding the handle 20 with his or her hand, the eccentric shaft 50 is rotated by the operation of the electric motor 40, and the eccentric weight 52 generates vibration, thus imparting the vibration to the bristles 11.

Here, the switch 22 may simply control the on/off, and in addition, may be configured to control a vibration pattern. That is, according to this embodiment, two or more vibration patterns may be stored, and the vibration pattern may be changed each time the switch 22 is repeatedly pressed. In this case, the vibration pattern means the period, strength, and time of vibration.

Of course, a plurality of switches 22 may be provided. Any one of the switches 22 may control the on/off, while another switch 22 may select the vibration pattern. Furthermore, a lighting apparatus (not shown) such as an LED may be attached in the vicinity of the switch 22 or at a certain position of the handle 20. The lighting apparatus may indicate whether the vibration is on or off, the vibration pattern, the state of the power supply 30, etc.

The power supply 30 may be accommodated in the handle 20 to supply power to the electric motor 40. The power supply 30 may be in the form of a replaceable battery. In this case, the power supply 30 may be replaced by opening the cover of the handle 20.

Alternatively, the power supply 30 may be a battery that is not replaceable, and may be charged using the cover of the handle 20 or the like. Of course, the power supply 30 may be replaced and charged while being accommodated in the handle 20.

The power storage amount of the power supply 30 may be indicated to a user by the above-described lighting apparatus. In addition, when it is determined that the power of the power supply 30 is insufficient, vibration having the vibration pattern different from the vibration pattern for brushing may be imparted to allow a user to identify the insufficient power.

The power supply 30 may be electrically connected to the electric motor 40, and may be operated by the switch 22 to determine whether or not to supply power. The power supply 30 may be provided in the handle 20 to be adjacent to the electric motor 40.

The electric motor 40 is accommodated in the handle 20 to generate rotating force. The electric motor 40 may be operated by power that is supplied by the power supply 30, and may be controlled in operation and rotation by the switch 22.

A motor shaft 41 is provided on the electric motor 40, and the other end of the eccentric shaft 50 is coupled to the motor shaft 41. In other words, one end of the eccentric shaft 50 may be rotatably coupled to the bearing 212 provided in the head coupler 21, while the other end may be connected to the motor shaft 41 to be rotated integrally with the motor shaft 41.

In this embodiment, since a rotating shaft 53 of the eccentric shaft 50 is made of metal, the length of the rotating shaft 53 may be sufficiently increased to secure vibration force while guaranteeing the durability and elasticity of the eccentric shaft 50. In this case, the size of the electric motor 40 may be reduced. That is, in this embodiment, the size of the electric motor 40 may be reduced by 50% or more of the size of the conventional motor. Nevertheless, according to this embodiment, as the rotating shaft 53 is made of metal such as nickel titanium and a total length of the eccentric shaft 50 is sufficiently secured, the transmission efficiency of vibration can be ensured.

The eccentric shaft 50 is connected to the electric motor 40 to be rotated, and at least a portion thereof becomes eccentric to generate vibration, thus transmitting the vibration to the head coupler 21. The vibration generated by the eccentric shaft 50 is transmitted through the head coupler 21 to the head 10. However, as described above, since the vibration damping member is provided on the other end of the head coupler 21, the vibration generated by the eccentric shaft 50 may be suppressed from being transmitted to a user's hand.

The eccentric shaft 50 includes a motor fixing part 51, an eccentric weight 52, a rotating shaft 53, a weight fixing part 54, shock absorbers 55a and 55b, and a bearing fixing part 56.

The motor fixing part 51 is connected to the electric motor 40. The motor fixing part 51 is configured to surround the motor shaft 41 of the electric motor 40, and is firmly coupled to the motor shaft 41 to make the entire eccentric shaft 50 be rotated together when the motor shaft 41 is rotated.

In order to prevent the motor fixing part 51 from rotating idle around the motor shaft 41 while surrounding the motor shaft 41, the motor shaft 41 or a hole of the motor fixing part 51 into which the motor shaft 41 is inserted may have a non-circular section.

Alternatively, the motor shaft 41 is provided with a component similar to the above-described protrusion (not shown), so that the motor shaft 41 and the motor fixing part 51 may be integrally rotated when the motor fixing part 51 is fitted over the motor shaft 41.

Since the eccentric weight 52 may be provided adjacent to the head coupler 21 or in the head coupler 21, be provided to be offset from the rotation center of the electric motor 40, and be rotated such that its central line is offset from the rotation center of the eccentric shaft 50 when the eccentric shaft 50 rotates, vibration may be generated by the eccentric weight 52. Here, the central line of the eccentric weight 52 may mean a line passing through the center of gravity in a longitudinal direction.

The central line of the eccentric weight 52 may be offset from the rotation center of the electric motor 40 by a distance within 2.0 mm, for example. Thus, if the central line of the eccentric weight 52 is too far from the rotation center of the electric motor 40, the vibration generated by the eccentric shaft 50 may increase, thus causing inconvenience to a user. Furthermore, as the eccentric shaft 50 rotates, the eccentric weight 52 is gradually biased to be distant from the rotation center of the eccentric shaft 50 and strikes the inner surface of the head coupler 21, so that noise may be undesirably generated. Of course, a distance between the central line of the eccentric weight 52 and the rotation center of the electric motor 40 is not limited to the above-described distance.

Particularly, according to this embodiment, even if external pressure of 1.0 kgf is applied, the generation of noise by the eccentric weight 52 of the rotating eccentric shaft 50 may be suppressed. Even though external pressure or shock is applied, the generation of noise may be suppressed by a distance between the central line of the eccentric weight 52 and the rotation center of the electric motor 40, a material of the rotating shaft 53, and/or the absorbers 55a and 55b.

The rotating shaft 53 connects the motor fixing part 51 and the eccentric weight 52. One end of the rotating shaft 53 may be connected to the eccentric weight 52, while the other end may be connected to the motor fixing part 51. One end of the rotating shaft 53 may be connected to the eccentric weight 52 via the weight fixing part 54.

The rotating shaft 53 may connect the motor fixing part 51 and the eccentric weight 52, and be made of a metal material. In this case, the rotating shaft 53 may be made of nickel titanium or the like. The nickel titanium is material that may sufficiently secure elastic force, restoring force, and durability so as to implement the basic function of the eccentric shaft 50.

That is, the rotating shaft 53 that is not made of synthetic resin but nickel titanium may effectively suppress noise from being generated by collision between the eccentric weight 52 and an inner surface of the head coupler 21 through elastic force and restoring force even if external shock is applied, and simultaneously secure durability, thus preventing the rotating shaft from being broken.

However, in order to increase the restoring force and the elastic force, the rotating shaft 53 may have the diameter of 0.4 to 1.0 mm, and preferably the diameter of 0.7 to 0.8 mm. The rotating shaft 53 having such a diameter may solve a problem in which the vibration width of the eccentric weight 52 is increased and the eccentric weight 52 collides with the head coupler 21 or the like if the diameter is too small, and may solve a problem in which the restoring force is reduced if the diameter is too large.

In other words, according to this embodiment, the rotating shaft 53 is made of metal, such as nickel titanium, to ensure restoring force and elastic force by the rotating shaft 53 when the eccentric shaft 50 rotates, thus suppressing noise from being generated by the eccentric weight 52, and to simultaneously secure durability, thus preventing the eccentric shaft 50 from being broken.

The weight fixing part 54 connects the eccentric weight 52 and the rotating shaft 53. If the eccentric weight 52 is directly connected to the rotating shaft 53, stress may concentrate on a connecting portion between the rotating shaft 53 and the eccentric weight 52 due to a height difference between the rotating shaft 53 and the eccentric weight 52, so that the connecting portion may become vulnerable. Thus, the weight fixing part 54 may be provided between the rotating shaft 53 and the eccentric weight 52, thus compensating for a vulnerable point.

Similarly to the motor fixing part 51, the weight fixing part 54 may have a section that is relatively larger than that of the rotating shaft 53. The diameter of the weight fixing part 54 may be equal to or different from that of the motor fixing part 51. However, for example, since the weight fixing part 54 is configured to connect the rotating shaft 53 and the eccentric weight 52, the weight fixing part may have a diameter that is larger than that of the rotating shaft 53 and smaller than the maximum diameter of the eccentric weight 52. That is, when the diameter of the motor fixing part 51 is equal to the maximum diameter of the eccentric weight 52, the diameter of the weight fixing part 54 may be smaller than the diameter of the motor fixing part 51.

The shock absorbers 55a and 55b are provided between the motor fixing part 51 and the rotating shaft 53 and/or between the weight fixing part 54 and the rotating shaft 53. The shock absorber 55a or 55b may have a shape in which a section is enlarged from the rotating shaft 53 to the motor fixing part 51 or the weight fixing part 54, for example, the shape of a truncated cone.

As described above in the weight fixing part 54, the shock absorbers 55a and 55b may be provided to prevent a portion of the eccentric shaft 50 that is suddenly enlarged in section from becoming vulnerable.

The shock absorbers 55a and 55b each may have a height that is within 35% of a length between the motor fixing part 51 and the weight fixing part 54. This is an optimized value to secure elastic force and restoring force.

The shock absorber 55a provided between the motor fixing part 51 and the rotating shaft 53 may be relatively smaller in height than the shock absorber 55b provided between the rotating shaft 53 and the weight fixing part 54. Furthermore, the shock absorber 55a provided between the motor fixing part 51 and the rotating shaft 53 may have a maximum section that is equal to or different from the shock absorber 55b provided between the rotating shaft 53 and the weight fixing part 54. Of course, the size of the two shock absorbers 55a and 55b is not limited to the above-mentioned size.

The shock absorbers 55a and 55b may be used to indirectly connect the rotating shaft 53 to the motor fixing part 51 and the weight fixing part 54. That is, the rotating shaft 53 is merely secured to the shock absorbers 55a and 55b but may not be directly connected to the motor fixing part 51 and the weight fixing part 54.

Of course, the shock absorber 55a or 55b may be provided to surround one end or the other end of the rotating shaft 53 that is directly connected to the weight fixing part 54 or the motor fixing part 51. In other words, one end or the other end of the rotating shaft 53 may be directly or indirectly connected to the weight fixing part 54 or the motor fixing part 51, and the shock absorber 55a or 55b may be provided to surround the connecting portion.

A groove 551 may be provided in each of the shock absorbers 55a and 55b. At least one or more grooves 551 may be formed in a surface of each shock absorber. According to this embodiment, the groove 551 is formed, so that the elastic force may be increased and shock may be absorbed. Here, the grooves 551 may be configured such that their sizes are relatively increased from the rotating shaft 53 to the motor fixing part 51 or the weight fixing part 54, but the shape, size or arrangement of the grooves 551 are not limited to the above-mentioned shape, size or arrangement.

The bearing fixing part 56 protrudes from the eccentric weight 52, and is rotatably coupled to the bearing 212 provided in the head coupler 21. The bearing fixing part 56 is secured to the bearing 212 but is rotated separately from the head coupler 21, unlike the motor fixing part 51 that surrounds the motor shaft 41 and rotates integrally with the motor shaft 41.

That is, if the eccentric shaft 50 is rotated by the electric motor 40, the eccentric shaft 50 may stably continue to rotate because the bearing fixing part 56 forming one end of the eccentric shaft 50 is supported by the bearing 212. Here, the bearing fixing part 56 may have a section that is relatively larger than that of the rotating shaft 53 but is relatively smaller than that of the motor fixing part 51 or the weight fixing part 54.

The eccentric shaft 50 may be made of materials (e.g. synthetic resin material) other than metal, except for the rotating shaft 53 made of a metal material. Here, the weight fixing part 54, the eccentric weight 52, and the bearing fixing part 56 may be integrally provided, and the motor fixing part 51 may be separately provided.

Therefore, one end of the rotating shaft 53 is directly and indirectly coupled to the weight fixing part 54, and the other end is directly and indirectly coupled to the motor fixing part 51, thus connecting the motor fixing part 51 and the eccentric weight 52. In other words, the eccentric shaft 50 may be manufactured by preparing components composed of the rotating shaft 53, the motor fixing part 51, the weight fixing part 54, the eccentric weight 52, and the bearing fixing part 56, and then connecting the motor fixing part 51 and the above-mentioned components with the rotating shaft 53 being interposed therebetween.

Of course, if the weight fixing part 54 or the like is made of the metal material, the eccentric shaft 50 may be integrally manufactured. However, in this case, vibration may become severe and the restoring force may be reduced. In this embodiment, only the rotating shaft 53 is made of the metal material and the remaining components of the eccentric shaft 50 are made of a material such as synthetic resin, and then the eccentric shaft 50 may be completed through an assembly process.

As such, according to this embodiment, the rotating shaft 53 in the eccentric shaft 50 is made of the metal material to secure elastic force and restoring force and simultaneously ensure durability, thus suppressing noise from being generated, increasing a service life, and maximizing consumer satisfaction.

The present disclosure is not limited to the above-described embodiments, and combination of the above embodiments or combination of at least one of the above embodiments and known technologies may be naturally included as another embodiment.

Although the present disclosure was described with reference to specific embodiments, it is apparent to those skilled in the art that the present disclosure may be changed and modified in various ways without departing from the scope of the present disclosure, which is described in the following claims.

All simple modifications or changes of the present disclosure fall within the purview of the present disclosure, and the specific scope of the present disclosure will be apparent from the following claims.

[Description of reference numerals of important parts]

| | |
|---|---|
| 1: vibrating toothbrush | 10: head |
| 11: bristle | 20: handle |
| 21: head coupler | 211: protrusion |
| 212: bearing | 22: switch |
| 30: power supply | 40: electric motor |
| 41: motor shaft | 50: eccentric shaft |
| 51: motor fixing part | 52: eccentric weight |
| 53: rotating shaft | 54: weight fixing part |
| 55a, 55b: shock absorber | 551: groove |
| 56: bearing fixing part | |

The invention claimed is:

1. A vibrating toothbrush having a head in which bristles are planted, and a handle from which a head coupler protrudes, the head being detachably coupled to the head coupler, the toothbrush comprising:
an electric motor accommodated in the handle to generate rotating force; and
an eccentric shaft rotatably connected to the electric motor, at least a portion thereof being eccentric to generate vibration and thereby transmit vibration to the head coupler,
wherein the eccentric shaft comprises:
a motor fixing part connected to the electric motor;
an eccentric weight configured to be offset from a rotation center of the electric motor; and
a rotating shaft formed of a metal material, and connecting the motor fixing part and the eccentric weight, and
wherein the rotating shaft is provided with shock absorbers respectively at opposite sides thereof, the shock absorbers absorbing external shock.

2. The vibrating toothbrush of claim 1, wherein the rotating shaft has a diameter of 0.4 to 1.0 mm.

3. The vibrating toothbrush of claim 1, wherein a central line of the eccentric weight is offset from the rotation center of the electric motor by a distance within 2 mm.

4. The vibrating toothbrush of claim 1,
wherein the eccentric shaft further comprises a weight fixing part connecting the eccentric weight and the rotating shaft,
wherein the rotating shaft is formed of the metal material to have an elastic force and a restoring force and has a diameter that is relatively smaller than that of each of the motor fixing part, the eccentric weight, and the weight fixing part, and
wherein the shock absorbers are symmetrically provided at the opposite sides of the rotating shaft.

5. The vibrating toothbrush of claim 4, wherein a first shock absorber among the shock absorbers connects the motor fixing part and the rotating shaft and a second shock absorber among the shock absorbers connects the weight fixing part and the rotating shaft.

6. The vibrating toothbrush of claim 5, wherein each of the shock absorbers has a section that is enlarged from the rotating shaft to the motor fixing part or the weight fixing part.

7. The vibrating toothbrush of claim 5, wherein the rotating shaft is not directly connected to the eccentric weight, and
wherein the rotating shaft is indirectly connected to the eccentric weight by the weight fixing part and the second shock absorber.

8. The vibrating toothbrush of claim 5, wherein the first shock absorber has a height that is relatively smaller than that of the second shock absorber.

9. The vibrating toothbrush of claim 5, wherein the rotating shaft is indirectly connected to the motor fixing part by the first shock absorber and to the weight fixing part by the second shock absorber.

10. The vibrating toothbrush of claim 4, wherein each of the shock absorbers has a height that is within 35% of a length between the motor fixing part and the weight fixing part.

11. The vibrating toothbrush of claim 4, wherein each of the shock absorbers is provided to surround a first end or a second end of the rotating shaft that is directly connected to the weight fixing part or the motor fixing part.

12. The vibrating toothbrush of claim 4,
wherein the eccentric shaft is made of a synthetic resin material, except for the rotating shaft,
wherein the weight fixing part and the eccentric weight are integrally provided, and
wherein the first end of the rotating shaft is coupled to the weight fixing part, and the second end thereof is coupled to the motor fixing part, thus connecting the motor fixing part and the eccentric weight.

13. The vibrating toothbrush of claim 1, wherein the motor fixing part is connected to a motor shaft of the electric motor, and
wherein the rotating shaft has a thickness that is smaller than that of the motor shaft.

14. The vibrating toothbrush of claim 1, wherein the eccentric weight is provided adjacent to the head coupler or provided in the head coupler.

15. The vibrating toothbrush of claim 1, wherein the eccentric shaft further comprises:
a bearing fixing part protruding from the eccentric weight, and rotatably coupled to a bearing that is provided in the head coupler.

16. The vibrating toothbrush of claim 15, wherein the bearing fixing part has a section that is relatively larger than that of the rotating shaft but is relatively smaller than that of the motor fixing part or the weight fixing part.

17. An eccentric shaft used in a vibrating toothbrush that is configured to accommodate an electric motor therein and impart vibration to bristles, the eccentric shaft comprising:
a motor fixing part connected to the electric motor;
an eccentric weight configured to be offset from a rotation center of the electric motor; and
a rotating shaft formed of a metal material and connecting the motor fixing part and the eccentric weight;
wherein the rotating shaft is provided with shock absorbers respectively at opposite sides thereof, the shock absorbers absorbing external shock.

18. The eccentric shaft of claim 17, further comprising:
a weight fixing part connecting the eccentric weight and the rotating shaft,
wherein a first shock absorber among the shock absorbers is provided between the motor fixing part and the rotating shaft and a second shock absorber among the shock absorbers is provided between the weight fixing part and the rotating shaft,
wherein the rotating shaft is formed of the metal material to have an elastic force and a restoring force and has a diameter that is relatively smaller than that of each of the motor fixing part, the eccentric weight, and the weight fixing part, and
wherein the shock absorbers are symmetrically provided at the opposite sides of the rotating shaft.

* * * * *